(12) United States Patent
Shih et al.

(10) Patent No.: US 10,589,186 B2
(45) Date of Patent: Mar. 17, 2020

(54) CLIP FOR SECURING VESSEL INTERNALS AND METHOD OF ASSEMBLY

(71) Applicant: UOP LLC, Des Plaines, IL (US)

(72) Inventors: Derek H. Shih, Getzville, NY (US); Michael J. Behm, Lockport, NY (US); Shawn D. Sheedy, Akron, NY (US); Peter J. Wantuck, East Aurora, NY (US); John R. Ulmer, West Seneca, NY (US)

(73) Assignee: UOP LLC, Des Plaines, IL (US)

( * ) Notice: Subject to any disclaimer, the term of this patent is extended or adjusted under 35 U.S.C. 154(b) by 169 days.

(21) Appl. No.: 15/685,753

(22) Filed: Aug. 24, 2017

(65) Prior Publication Data
US 2018/0133618 A1 May 17, 2018

Related U.S. Application Data

(60) Provisional application No. 62/423,719, filed on Nov. 17, 2016.

(51) Int. Cl.
| | | |
|---|---|---|
| *B01D 3/32* | (2006.01) | |
| *F16B 5/00* | (2006.01) | |
| *B01J 19/32* | (2006.01) | |
| *F16B 21/08* | (2006.01) | |

(52) U.S. Cl.
CPC ............ *B01D 3/326* (2013.01); *B01D 3/324* (2013.01); *F16B 5/0036* (2013.01); *B01J 19/325* (2013.01); *B01J 2219/00761* (2013.01); *F16B 21/086* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,346,487 | A | * 7/1920 | Doyle | ...................... D06F 53/04 403/182 |
| 3,071,400 | A | * 1/1963 | Bellock | ................. F16B 7/0446 211/206 |
| 4,120,919 | A | 10/1978 | McClain | |
| 4,691,493 | A | 9/1987 | Larsen | |

(Continued)

FOREIGN PATENT DOCUMENTS

| | | |
|---|---|---|
| GB | 647824 A | 12/1950 |
| RU | 111321 U1 | 12/2011 |

OTHER PUBLICATIONS

Dictionary.com, "Definition of Flexible", accessed Oct. 10, 2019, https://www.dictionary.com/browse/flexible?s=t (Year: 2019).*

(Continued)

*Primary Examiner* — Matthew P Travers (57) ABSTRACT

A clip assembly for holding down a member in a vessel comprising a clip comprising a first panel comprising a tab extending from the first panel and a protrusion extending from the first panel, and a second panel integral with and normal to the first panel for engaging the member. A wall in the vessel comprises a cut-out adapted to receive the tab and a recess disposed laterally to the cut-out and adapted to receive the protrusion upon inserting the tab into the cut-out and sliding the tab in the cut-out laterally with respect to the recess. The subject matter also pertains to the clip itself and the method of use.

14 Claims, 7 Drawing Sheets

(56) References Cited

U.S. PATENT DOCUMENTS

| | | | |
|---|---|---|---|
| 6,592,106 B1 | 7/2003 | Eaton | |
| 7,018,127 B2 | 3/2006 | Walsh et al. | |
| 7,287,746 B2 | 10/2007 | Fehr et al. | |
| 7,377,498 B2 | 5/2008 | Fehr et al. | |
| 8,480,062 B2 | 7/2013 | Kim et al. | |
| 9,072,986 B2 * | 7/2015 | Kim | B01D 3/326 |
| 2003/0070381 A1 * | 4/2003 | Hawang | A47B 47/042 |
| | | | 52/536 |
| 2010/0018010 A1 * | 1/2010 | Perrott | B01J 3/03 |
| | | | 24/455 |
| 2013/0048525 A1 | 2/2013 | Lesniak | |
| 2013/0105502 A1 * | 5/2013 | Naunheimer | B01D 3/32 |
| | | | 220/694 |

OTHER PUBLICATIONS

Search Report dated Feb. 14, 2018 for corresponding PCT Appl. No. PCT/US2017/056025.

* cited by examiner

CLIP FOR SECURING VESSEL INTERNALS AND METHOD OF ASSEMBLY

CROSS-REFERENCE TO RELATED APPLICATION

This application claims priority from Provisional Application No. 62/423,719 filed Nov. 17, 2016, the contents of which cited application are hereby incorporated by reference in its entirety.

FIELD

The present invention generally relates to a clip for use in vessels, and more particularly relates to a clip assembly for securing a horizontal member to a vertical member.

BACKGROUND

Vessels, such as, hydroprocessing vessels, reactors, absorbers, strippers, and distillation columns, typically require means for holding down horizontally oriented components relative to vertical components. Such vessels typically promote fluid contacting such as vapor-liquid contacting. Trays are often used to promote vapor-liquid contacting. Often, trays are installed during initial construction of the vessel, as well as removed and installed during vessel downtime for maintenance or refurbishing. Trays typically include a deck with or without openings for allowing liquid to spread out and be contacted by up flowing vapor. Trays also include downcomers that protrude over the deck to provide a weir and extend below the deck to transfer liquid that spills over the weir to the next tray below. Downcomers and decks are typically secured at their periphery to a support ring positioned along an internal circumference of the vessel. However, the deck must be secured to the downcomer to prevent the deck from riding up and reducing the weir height relative to the deck.

SUMMARY OF THE INVENTION

The subject matter includes a clip, an assembly comprising the clip and a method of using the clip to hold down a member in a vessel. The clip comprises a first panel comprising a tab extending from the first panel and a protrusion extending from the first panel, and a second panel integral with the first panel for engaging the member. A wall in the vessel comprises a cut-out adapted to receive the tab and a recess disposed laterally to the cut-out and adapted to receive the protrusion upon inserting the tab into the cut-out and sliding the tab in the cut-out laterally with respect to the recess.

The clip is designed to save time in the installation and removal of horizontal members in a vessel.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various exemplary embodiments contemplated herein are directed to a clip for holding down a horizontal component relative to a vertical component in a contacting vessel. In an aspect, the clip may be for securing a deck to a downcomer in a contacting vessel such as a vapor-liquid contacting vessel. The clip is configured for easy installation in the vessel.

Figure 1:
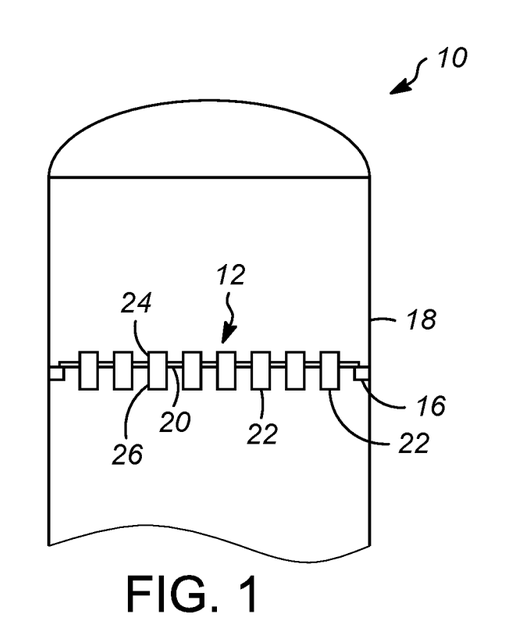
FIG. 1 is a side cross-sectional view of a vessel in accordance with an exemplary embodiment.

An exemplary vessel 10 is partially illustrated in FIG. 1. The vessel 10 can be any suitable vessel, for example, a hydroprocessing vessel, a reactor, an absorber, a stripper, a distillation column, or the like. Generally, such a vessel 10 facilitates mass transfer operations in a flow orientation, such as down flow, up flow, co-current flow, and counter-current flow for one or more fluids including a vapor, a liquid, and/or a mixed-phase of vapor and liquid and solids such as catalyst. As shown, the vessel 10 includes a mixing, contacting, collecting, and/or redistribution tray 12. While only one tray 12 is shown for illustrative purposes, it will be appreciated that vessel 10 can have any number of trays suitable for a particular application.

As shown, the tray 12 rests on, and is typically secured to, support structure comprising a ring 16 secured circumferentially to a wall 18 of the vessel 10. Usually, the tray 12 comprises a deck 20 that may have several openings for permitting the passage of fluid therethrough, such as allowing liquid to flow downward and gas to rise upwards to facilitate mass transfer operations. The tray 12 can also include a plurality of downcomers 22 defining weirs 24 extending above the deck 20 and a distribution trough 26 that extends below the deck 20. Liquid that spills over the weir 24 from the deck 20 into the trough 22 is distributed from openings in the trough to a tray below (not shown). The tray 12 may include other structures, such as bubble caps, tray valves, beams to facilitate and support desired operations.

Downcomers 22 and decks 20 are typically secured at their periphery to a support ring 16 positioned along an internal circumference of the vessel 10 as shown for the deck in FIG. 1. However, the deck 20 must be secured to the downcomer 22 to prevent the deck from riding up and reducing the height of the weir 24 above the deck 20 which could disrupt proper distribution.

Figure 2:
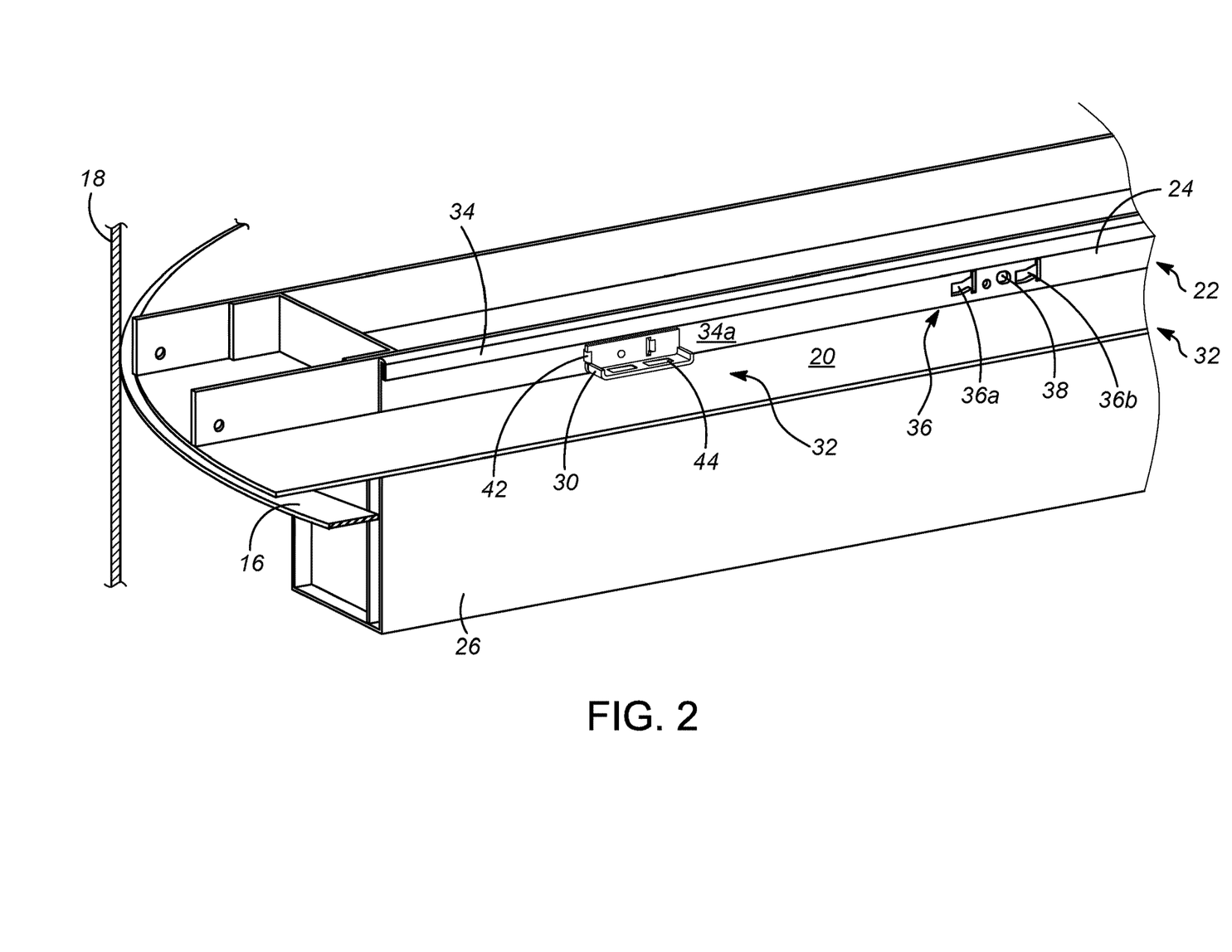
FIG. 2 is a perspective view of an assembly including a clip in the vessel of FIG. 1 in accordance with an exemplary embodiment.

FIG. 2 shows a clip 30 and its assembly 32 for holding down a member in the vessel 10. Specifically, the clip 30 is for holding the deck 20 down relative to the downcomer 22. The clip 30 may be part of the assembly 32. The wall 34 may be part of the assembly 32. The wall 34 may be part of the downcomer 22 and provide the weir 24 and the trough 26 of the downcomer. Only one downcomer 22 and deck 20 is shown in FIG. 2, but many more may be provided to provide a single tray in the vessel 10. The clip 30 is adapted to be received in a cut-out 36 in the wall 34 in the vessel 10. The clip 30 comprises a first panel 42 and a second panel 44. The second panel 44 may be integral with the first panel 42. Moreover, the second panel 44 may be normal to the first panel 42. The first panel 42 is for engaging a vertical member which may comprise the wall 34. The second panel 44 is for engaging the horizontal member which may comprise the deck 20.

In FIG. 2, the clip 30 is removed from in front of the cut-out 36 to reveal the cut-out. A recess 38 is disposed laterally to the cut-out. The wall 34 may include a first cut-out 36a and a second cut-out 36b for each assembly 32. The wall 34 includes a first side 34a, and the clip 30 is adapted to be assembled adjacent to the first side.

Figure 3:
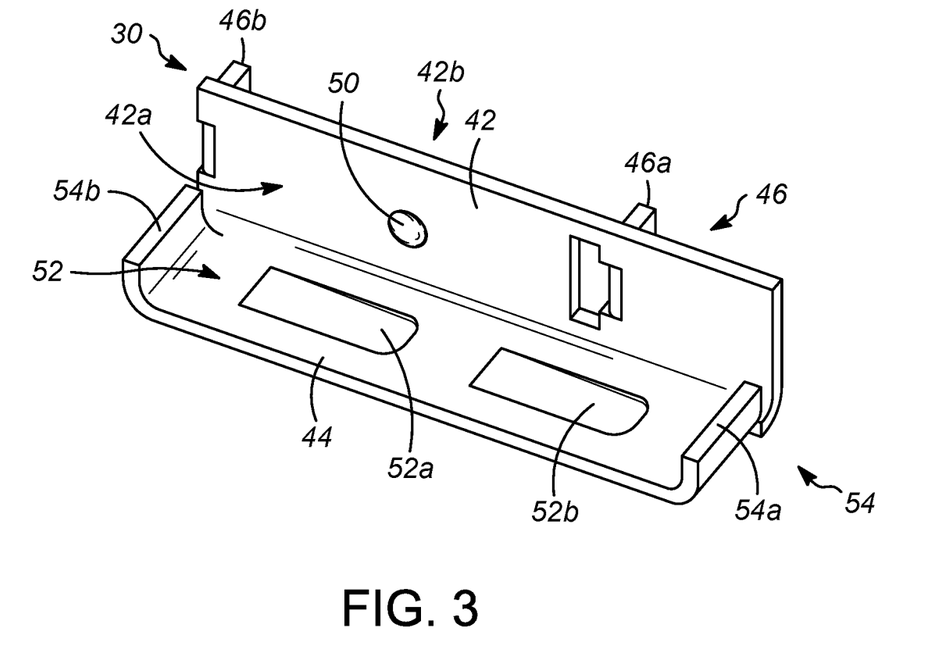
FIG. 3 is a perspective view of the clip of FIG. 2.

FIG. 3 shows a perspective view of the clip 30. The first panel 42 has a first side 42a and a second side 42b. FIG. 3 best shows the front side 42a. A tab 46 extends from a second side 42b of the first panel 42 away from the second panel 44. A first tab 46a and a second tab 46b may extend from the second side of the first panel 42 away from the second panel 44. A protrusion or dimple 50 also protrudes or extends from the second side 42b of the first panel 42 away from the second panel 44. A bill 52 extends from the second panel 44 away from the first panel 42 for applying pressure to the horizontal member which may be the deck 20 of FIG. 2. The second panel 44 may comprise two bills 52a and 52b. The second panel 44 may also be equipped with an upturned edge 54. In an aspect, the second panel 44 may have a first upturned edge 54a and a second upturned edge 54b.

Figure 4:
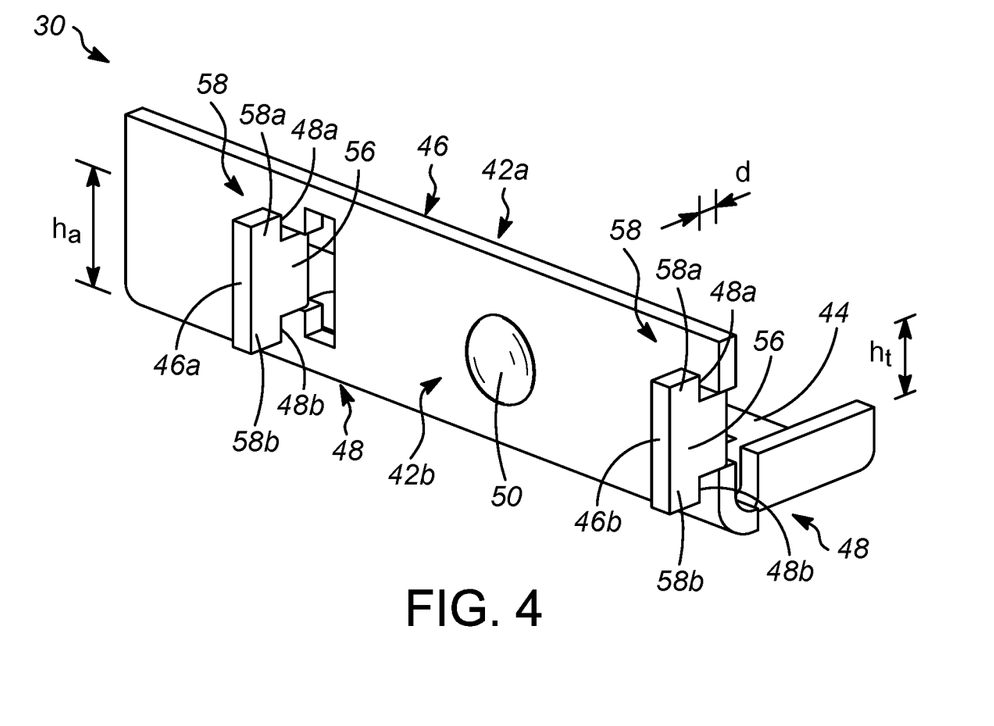
FIG. 4 is a perspective view of the opposite side of the clip of FIG. 2.

FIG. 4 shows a perspective view of the clip 30 which best shows a second side 42b of the first panel 42. The tab 46 comprises a trunk 56 and a lug 58 extending from the trunk. In an embodiment a first lug 58a and a second lug 58b extend from opposing sides of the trunk 56. The tab height $h_a$ of the tab 46 may be the height of the lug 58a and the trunk 56 together if only one lug 58a is used. If two lugs 58a are used, the tab height $h_a$ may be the height of the first lug 58a, the trunk 56 and the second lug 58b together. The trunk height $h_t$ of the trunk 56 of the tab 46 is also shown in FIG. 4. The depth "d" of the trunk 56 is greater than the thickness of the wall 34 shown in FIG. 2.

The first tab 46a and the second tab 46b extend from the second side 42b of the first panel 42 away from the second panel 44. The tab 46 is cut from the first panel 42 and bent from the first panel 42 from the first side 42a in the direction of the second side 42b away from the second panel 44 to leave an opening in the first panel having the same shape as the tab 46. The first tab 46a may be cut from within four edges of the first panel 42 and thus leaves the same shape in the first panel 42 as the tab 46a. The second tab 46b may be cut from a side edge of the first panel. The tabs 46 are preferably T-shaped. The dimple 50 also protrudes from the second side 42b away from the second panel 44. The lug 58 includes a proximate edge 48. The first lug 58a provides a first proximal edge 48a that faces the second side 42b. The optional second lug 58b may provide a second proximal edge 48b that faces the second side 42b.

Figure 5:
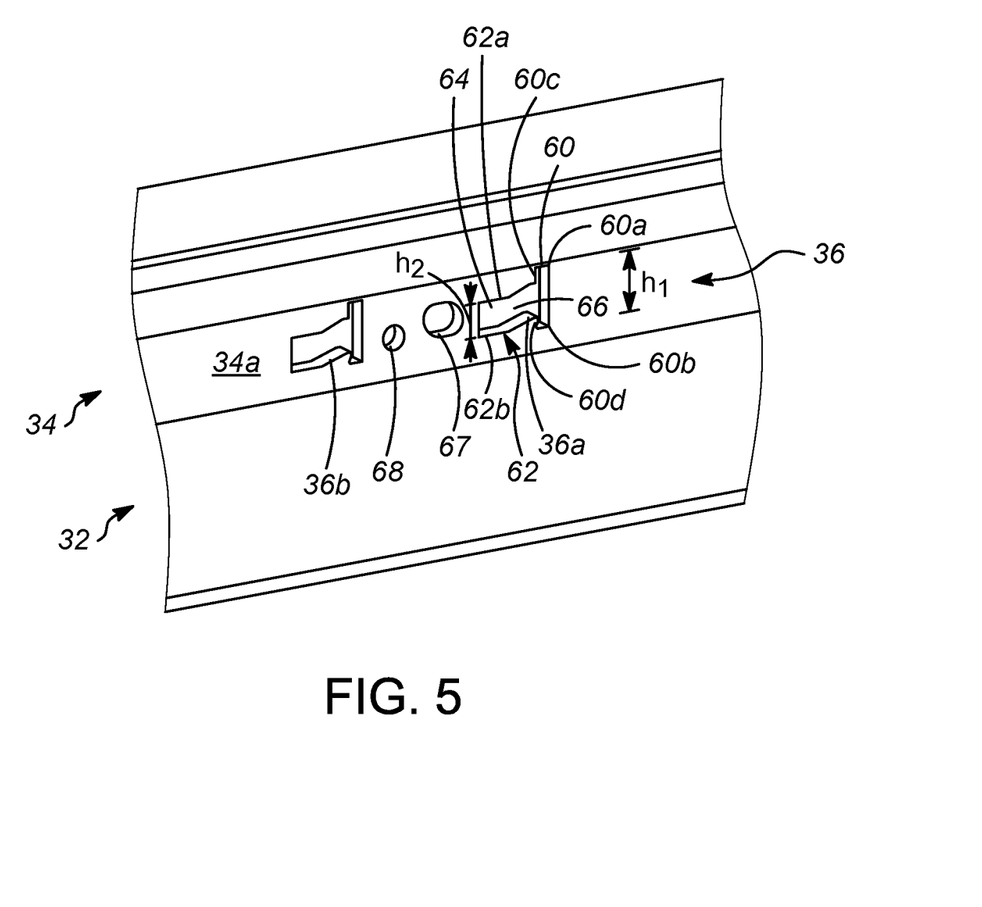
FIG. 5 is an perspective view of an assembly of the clip of FIG. 2 in accordance with an exemplary embodiment.

FIG. 5 shows the wall 34 of the assembly 32. The wall 34 comprises a first side 34a and a cut-out 36. The wall 34 may have cut-outs 36 in pairs, comprising a first cut-out 36a and a second cut-out 36b, or other multiples grouped together to receive corresponding numbers of tabs 46 shown in FIG. 4. Only one cut-out 36a is described with regard to FIG. 5. The cut-out 36a includes an entry opening 60 of a first height "$h_1$" between a first upper edge 60a and a first lower edge 60b. The cut-out 36a also includes a channel 62 located laterally to the entry opening 60. The cut-out 36a has a second height $h_2$ in the channel 62 between a second upper edge 62a and a second lower edge 62b. The channel 62 includes a terminal section 64 in the channel. A second upper edge 62a and a second lower edge 62b in the terminal section 64 may be horizontal and parallel with each other. A transition section 66 in the channel 62 is located between the entry opening 60 and the terminal section 64. The second upper edge 62a in the transition section 66 may be an inclined upper edge. Moreover, the second lower edge 62b in the transition section 66 may be an inclined lower edge. The second upper edge 62a and the second lower edge 62b in the transition section 66 may be parallel with each other. The second upper edge 62a may also include a horizontal edge in the transition section 66. The second lower edge 62b may also include a horizontal edge in the transition section 66. The entry opening 60 may have an upper lateral edge 60c adjacent to the channel 62 between the first upper edge 60a and the second upper edge 62a. The entry opening 60 may also have a lower lateral edge 60d adjacent to the channel 62 between the first lower edge 60b and the second lower edge 62b. The wall 34 may include an optional initial opening 67 and a terminal opening 68. The terminal opening 68 may be located at a lower position than the initial opening 67. The optional initial opening 67 may be larger than the terminal opening 68.

Figure 6:
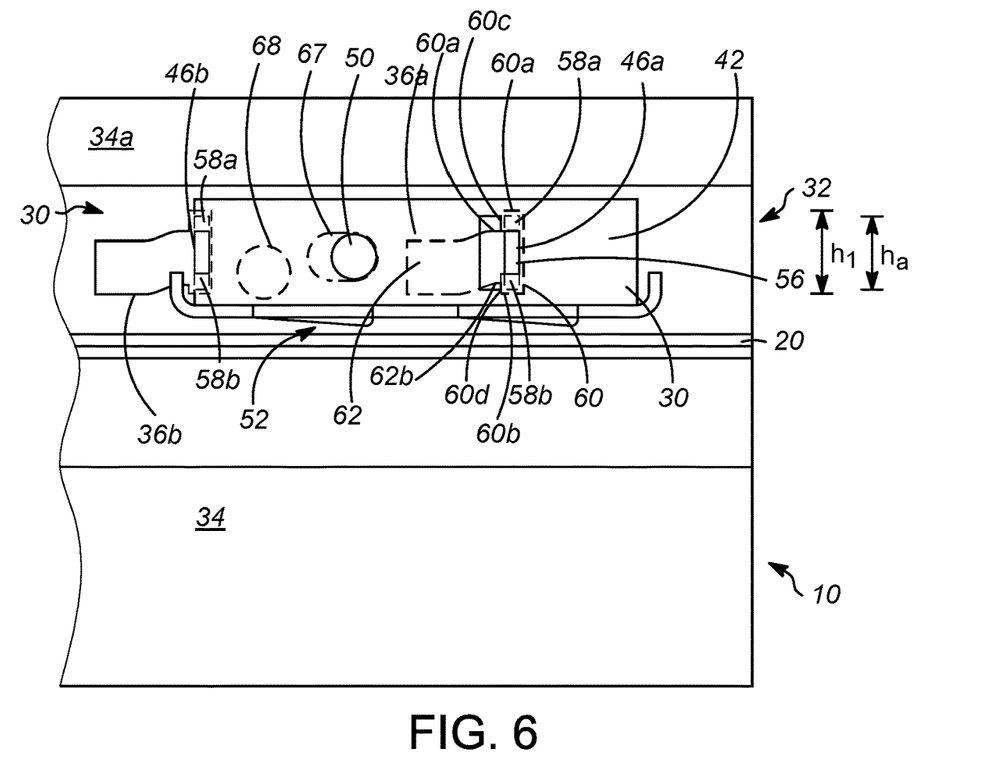
FIG. 6 is an elevational view of the assembly of FIG. 5 in a first position in accordance with an exemplary embodiment.

In FIG. 6 a method of assembly is shown for holding down a member which may be a deck 20 in a vessel 10 by use of the assembly 32 of the clip 30 and the wall 34. The method of assembly will be described with respect to one tab 46a and one cut-out 36a, but two or more tabs and cut-outs may be used in the assembly and method as shown. In FIG. 6, edges of openings in the wall 34 are shown in dashed lines to indicate that they are behind the clip 30. Moreover, lugs 58a and 58b of tabs 46a and 46b are shown in dashed lines to indicate that they are behind the first panel 42. A first side 34a of the wall 34 is adapted to receive the tab 46a in the cut-out 36a and a recess 68 is disposed laterally to the cut-out. The recess 68 may be disposed laterally between the two cut-outs 36a and 36b.

In FIG. 6, the tab 46a is inserted into the cut-out 36a in the wall 34 in a first position. Specifically, the first tab 46a is inserted from the first side 34a into the entry opening 60 of the first cut-out 36a. The height $h_1$ of the entry opening 60 between the first upper edge 60a and the first lower edge 60b is greater than a tab height $h_a$ of the tab 46a to permit insertion of the tab 46a into the entry opening 60. Accordingly, the entry opening 60 is sufficiently tall and wide to permit entry of the tab including the first lug 58a and the trunk 56 and the second lug 58b if used. Upper lateral edge 60c and lower lateral edge 60d of the entry opening 60 limit lateral movement of the tab 46a in the channel 62 toward a second position unless the trunk 56 is aligned with the channel 62 between the second upper edge 62a and the second lower edge 62b. The optional initial opening 67 in the wall 34 may receive the protrusion 50 while in the first position. The optional second tab 46*b* may similarly be inserted from the first side 34*a* into the entry opening 60 of the second cut-out 36*b*. In the first position, the bill 52 does not necessarily engage the deck 20.

Figure 7:
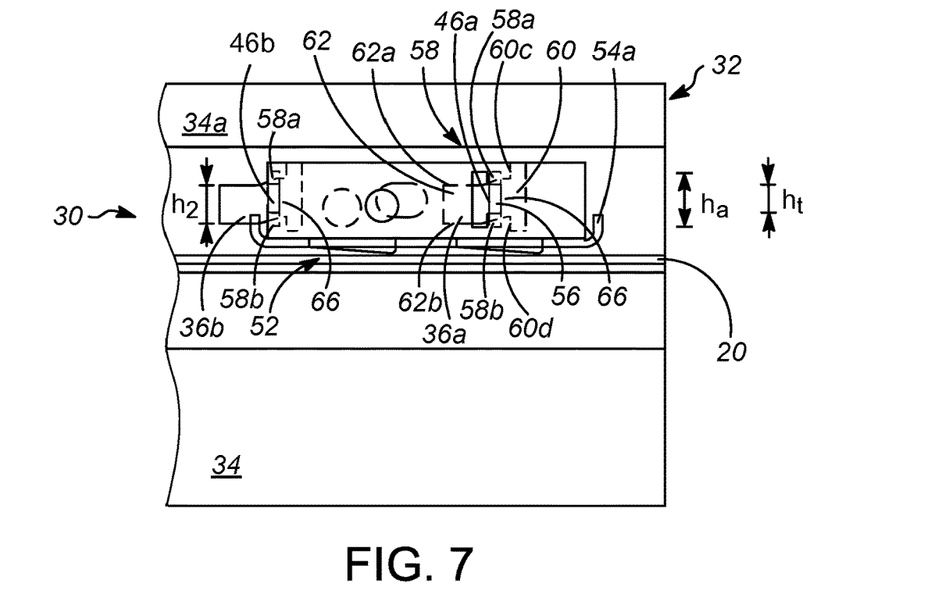
FIG. 7 is an elevational view of the assembly of FIG. 5 in transition in accordance with an exemplary embodiment.

FIG. 7 shows the clip 30 in assembly 32 with the wall 34 in transition between the first position and a second position with the trunk 56 in a transition section 66 in the channel 62. In FIG. 7, edges of openings in the wall 34 are shown in dashed lines to indicate that they are behind the clip 30. Moreover, lugs 58*a* and 58*b* of tab 46*a* and 46*b* are shown in dashed lines to indicate that they are behind the first panel 42. The tab height $h_a$ of the first tab 46*a* is greater than the second height $h_2$ in the channel 62 in the first cut-out 36*a*, so the first lateral edge 60*c* and the second lateral edge 60*d* permit lateral movement to the second position because the trunk 56 is aligned with the channel 62 between the second upper edge 62*a* and the second lower edge 62*b*. The upturned edge 54*a* may be tapped from the outside with an instrument, such as a hammer, to move the clip 30 into transition between the first position and the second position and ultimately to the second position. The second height $h_2$ of the channel 62 is less than the tab height $h_a$ but greater than a trunk height $h_t$ of the trunk 56 to permit the trunk to slide laterally in the channel but prevent the lug 58, which could be the first lug 58*a* and the second lug 58*b*, from passing back through the channel to the first side 34*a* of the wall. The second tab 46*b* may similarly be slid into the transition section 66 of the second cut-out 36*b*. The bill 52 may begin to engage the deck 20 while in transition to the second position.

Figure 8:
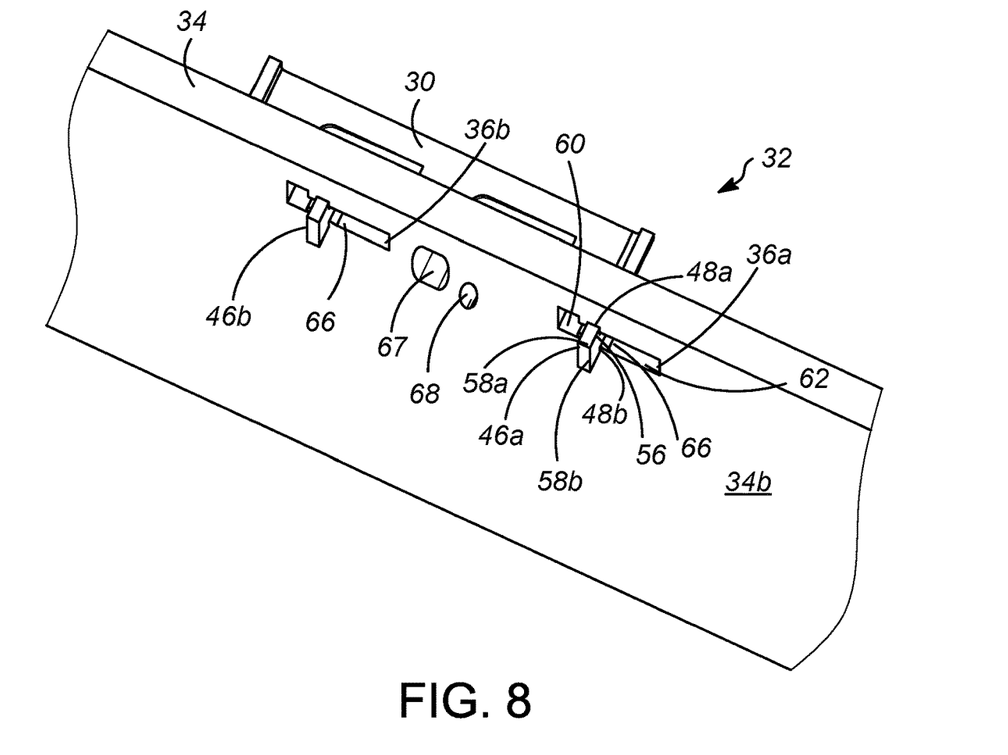
FIG. 8 is a perspective view of an opposite side of the assembly of FIG. 7 in accordance with an exemplary embodiment.
Figure 9:
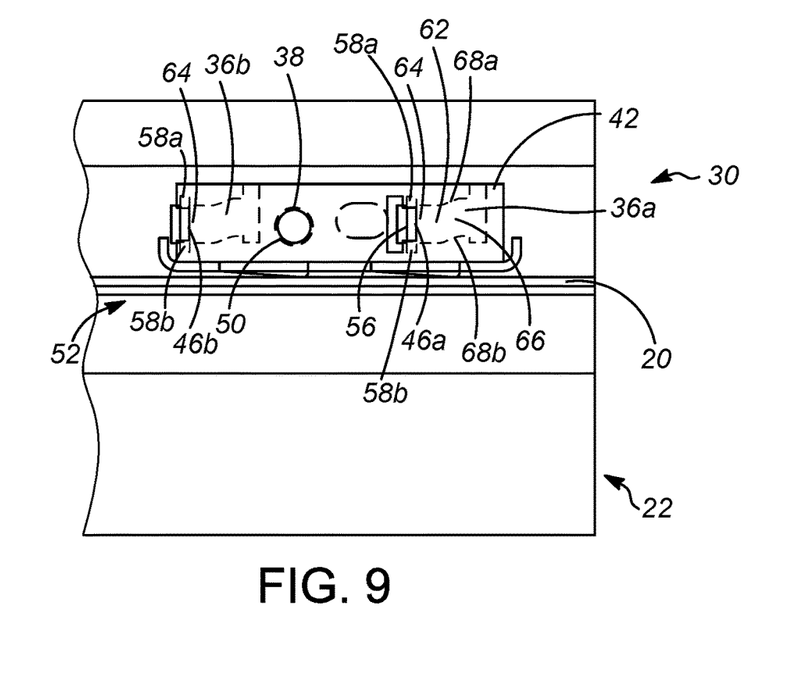
FIG. 9 is an elevational view of the assembly of FIG. 5 in a second position in accordance with an exemplary embodiment.

FIG. 8 shows the second side 34*b* of the wall 34 while the clip 30 is in assembly 32 with the wall 34 in transition between the first position and the second position with the trunk 56 in the transition section 66 in the channel 62. The proximal edge 48*a* of the lug 58*a* intrudes all the way into the entry opening 60 to clear a second side 34*b* of the wall 34. The proximal edge 48*a* of the lug 58*a* engages the second side 34*b* of the wall 34 upon insertion of the tab 46*a* into the cut-out 36*a* and sliding the tab 46*a* laterally. If the tab 46*a* has a second lug 58*b*, proximal edge 48*b* of the second lug 58*b* also engages the second side 34*b* of the wall upon insertion of the tab 46*a* into the cut-out and sliding the tab 46*a* laterally. The second tab 46*b* may similarly be slid into the transition section 66 of the second cut-out 36*b*. FIG. 9 shows the clip 30 in the second position with the trunk 56 in the terminal section 64 of the channel 62. In FIG. 9, edges of openings in the wall 34 are shown in dashed lines to indicate that they are behind the clip 30. Moreover, lugs 58*a* and 58*b* of tab 46*a* and 46*b* are shown in dashed lines to indicate that they are behind the first panel 42. The transition section 66 of the channel 62 has an inclined upper edge 68*a* for camming the trunk 56 into the terminal section 64 as it transitions into the second position from the first position. The transition section 66 has an inclined lower edge 68*b*. The recess 38 is adapted to receive the protrusion 50 upon inserting the tab 46*a* into the cut-out 36*a* and sliding the tab in said cut-out laterally with respect to the recess into the terminal section 64 in the second position.

The recess 38 receives the protrusion 50 when the trunk 56 is in the terminal section 64 in the second position to lock the clip 30 in the second position. The second tab 46*b* may similarly be slid into the terminal section 64 of the second cut-out 36*b*. The bill 52 extends downwardly from the second panel 54 and engages and applies pressure to the horizontal member which may be the deck 20 when the trunk 56 is in the terminal section 64 to hold the deck down relative to the downcomer 22.

Figure 10:
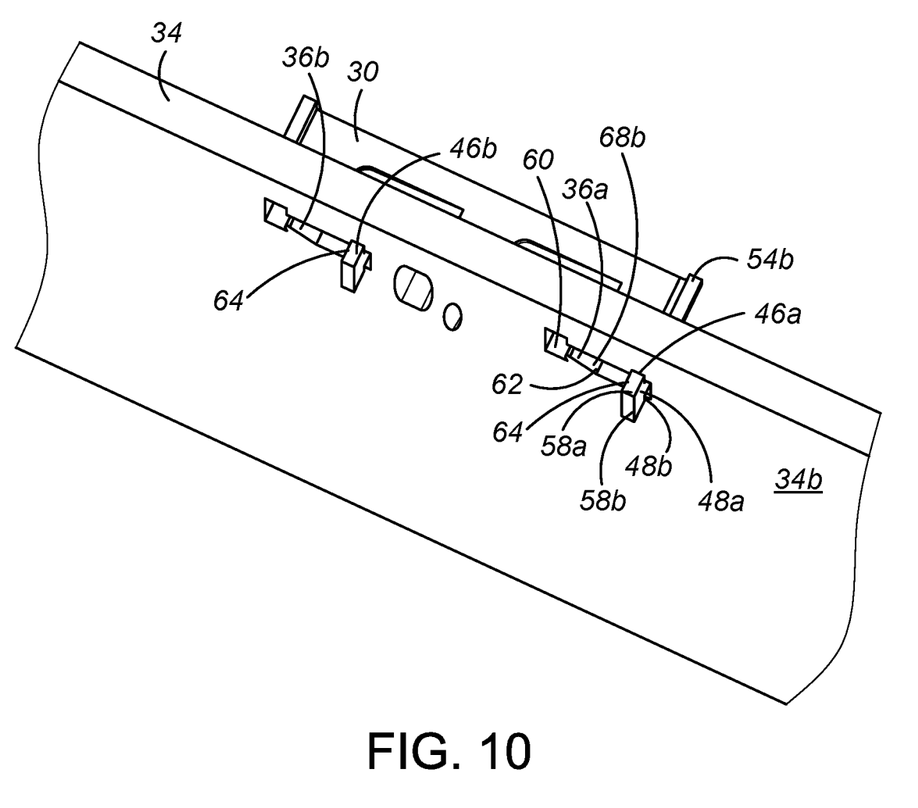
FIG. 10 is a perspective view of an opposite side of the assembly of FIG. 9 in accordance with an exemplary embodiment.

FIG. 10 shows the second side 34*b* of the wall 34 in the second position with the proximate edge 48*a* of the lug 58*a* engaging the second side 34*b* with the first tab 46*a* in the terminal section 64 of the channel 62 of the first cut-out 36*a*. Optionally, the proximate edge 48*b* of the lug 58*b* engages the second side 34*b* with the tab 46*a* in the terminal section 64 of the channel 62. The second tab 46*b* similarly may also be in the terminal section 64 of the channel 62 of second cut-out 36*b*. In the second position, the clip 30 is locked in place to hold down the deck 20 relative to the wall 34. The clips 30 are easily installed thereby saving time and money in the installation and removal of the deck 20.

To move the clip 30 from the second position to the first position, the second upturned edge 54*b* can be hit from the outside with an instrument such as a hammer to transition the tab 46*a* from the second position up the inclined lower edge 68*b* of the channel 62 into the entry opening 60 to the first position. Referring to FIG. 7, while moving the clip 30 from the second position to the first position, the inclined lower edge 68*b* of the cut-out 36*a* cams the trunk 56 of the tab 46*a* in the transition section 66 of the channel 62 to the entry opening 60. In the first position, the first lug 58*a* of the tab 46*a* and perhaps the second lug 58*b* of the tab 46*a* clear the second sided 34*b* of the first panel 34 in the entry opening 60, so the tab 46*a* can be removed from the cut-out 36*a*, permitting the clip 30 to be disassembled from the wall 34 so the deck 20 can be removed. If the clip 30 has a second tab 46*b*, the same is done to remove the second tab 46*b* from the second cut-out 36*b* enabling removal of the clip 30 from the wall 34 in the assembly 32.

Specific Embodiments

While the following is described in conjunction with specific embodiments, it will be understood that this description is intended to illustrate and not limit the scope of the preceding description and the appended claims.

A first embodiment of the invention is an apparatus for holding down a member in a vessel comprising a clip comprising a first panel comprising a tab extending from the first panel and a protrusion extending from the first panel, and a second panel integral with the first panel for engaging the member; a wall in the vessel comprising a cut-out adapted to receive the tab and a recess disposed laterally to the cut-out and adapted to receive the protrusion upon inserting the tab into the cut-out and sliding the tab in the cut-out laterally with respect to the recess. An embodiment of the invention is one, any or all of prior embodiments in this paragraph up through the first embodiment in this paragraph wherein the wall comprises a first side and a second side, the clip is adapted to be assembled adjacent to the first side and the tab includes a trunk and a lug extending from the trunk, the lug engaging a second side of the wall upon insertion of the tab into the cut-out and sliding the tab laterally. An embodiment of the invention is one, any or all of prior embodiments in this paragraph up through the first embodiment in this paragraph further including a bill extending downwardly from the second panel for applying pressure to the member. An embodiment of the invention is one, any or all of prior embodiments in this paragraph up through the first embodiment in this paragraph wherein the cut-out includes an entry opening of a first height between a first upper edge and a first lower edge that is greater than a tab height of the tab to permit insertion of the lug and trunk through the entry opening between the first upper edge and the first lower edge, a channel located laterally to the entry opening, the channel of a second height between a second upper edge and a second lower edge that is less than the tab height but greater than a trunk height of the trunk to permit the trunk to slide laterally in the channel but prevent the lug from passing back through the channel. An embodiment of the invention is one, any or all of prior embodiments in this paragraph up through the first embodiment in this paragraph further comprising a terminal section in the channel, the recess receives the protrusion when the trunk is in the terminal section. An embodiment of the invention is one, any or all of prior embodiments in this paragraph up through the first embodiment in this paragraph further comprising a transition section in the channel between the entry opening and the terminal section, the transition section having an inclined upper edge for camming the trunk into the terminal section. An embodiment of the invention is one, any or all of prior embodiments in this paragraph up through the first embodiment in this paragraph wherein the transition section has an inclined lower edge for camming the trunk into the entry opening. An embodiment of the invention is one, any or all of prior embodiments in this paragraph up through the first embodiment in this paragraph wherein the entry opening has lateral edges adjacent to the channel between the first upper edge and the second upper edge and the first lower edge and the second lower edge; the lateral edges limiting lateral movement of the tab in the channel. An embodiment of the invention is one, any or all of prior embodiments in this paragraph up through the first embodiment in this paragraph further comprising a bill extending downwardly from the second panel for applying pressure to the member when the trunk is in the terminal section. An embodiment of the invention is one, any or all of prior embodiments in this paragraph up through the first embodiment in this paragraph wherein the wall is a downcomer in a fluid contacting vessel and the member is a deck of a tray in the fluid contacting column.

A second embodiment of the invention is an apparatus for holding down a member comprising a first panel comprising a tab extending from the first panel, the tab comprising a trunk and a lug extending from the trunk, the first panel adapted for engaging a first side of a wall comprising a cut-out adapted to receive the trunk and the lug of the tab inserted therein, the lug engaging a second side of the wall upon lateral movement of the tab once inserted into the cut-out; a dimple protruding from the first panel adapted to engage a recess in the wall disposed laterally to the cut-out upon lateral movement of the tab once inserted into the cut-out; and a second panel integral with and normal to the first panel for engaging the member. An embodiment of the invention is one, any or all of prior embodiments in this paragraph up through the second embodiment in this paragraph further including a bill extending downwardly from the second panel for applying pressure to the horizontal member. An embodiment of the invention is one, any or all of prior embodiments in this paragraph up through the second embodiment in this paragraph wherein the tab is cut from the first panel and bent away from the first panel to leave an opening in the first panel having the same shape as the tab. An embodiment of the invention is one, any or all of prior embodiments in this paragraph up through the second embodiment in this paragraph wherein the tab is T-shaped.

A third embodiment of the invention is a method of holding down a member in a vessel comprising inserting a tab extending from a first panel into a cut-out in a wall in a first position; and sliding the tab laterally to a second position in the cut-out at which a protrusion extending from the first panel engages a recess in the wall located laterally to the cut-out. An embodiment of the invention is one, any or all of prior embodiments in this paragraph up through the third embodiment in this paragraph further comprising a second panel integral with the first panel, the second panel holding down a member while in the second position. An embodiment of the invention is one, any or all of prior embodiments in this paragraph up through the third embodiment in this paragraph further comprising a trunk and a lug of the tab are inserted into an entry opening in the cut-out with the first panel adjacent to a first side of the wall in the first position; and the lug engages a second side of the wall in the second position. An embodiment of the invention is one, any or all of prior embodiments in this paragraph up through the third embodiment in this paragraph further comprising sliding the trunk of the tab laterally from the first position to the second position through a channel in the cut-out that is more narrow than the entry opening. An embodiment of the invention is one, any or all of prior embodiments in this paragraph up through the third embodiment in this paragraph further comprising sliding the trunk over inclined edges of the channel that cam the tab downwardly to the second position to achieve engagement of the second panel and the member. An embodiment of the invention is one, any or all of prior embodiments in this paragraph up through the third embodiment in this paragraph in which the wall is a downcomer in a fluid contacting vessel and the member is a deck of a tray in the fluid contacting vessel.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A clip assembly for holding down a member in a vessel comprising:
   a clip comprising a first panel comprising a tab extending from said first panel and a protrusion extending from said first panel, and a second panel integral with said first panel for engaging the member, said second panel comprising a bill extending in a direction away from and beyond said second panel, said bill configured to apply pressure to the member while the second panel is spaced from the member; and
   a wall in said vessel comprising a cut-out adapted to receive said tab, a vertically oriented, inclined channel extending from said cut-out, and a recess disposed laterally to said cut-out, said recess adapted to receive said protrusion upon inserting said tab into said cut-out and sliding said tab in said cut-out and along said inclined channel laterally with respect to said recess.

2. The assembly of claim 1, wherein said wall comprises a first side and a second side, said clip is adapted to be assembled adjacent to the first side and said tab includes a trunk and a lug extending from said trunk, said lug engaging a second side of said wall upon insertion of said tab into said cut-out and sliding said tab laterally along said inclined channel.

3. The assembly of claim 2, wherein said cut-out includes an entry opening of a first height between a first upper edge and a first lower edge that is greater than a tab height of said tab to permit insertion of said lug and trunk through said entry opening between said first upper edge and said first lower edge, said inclined channel located laterally to said entry opening, said inclined channel of a second height between a second upper edge and a second lower edge that is less than said tab height but greater than a trunk height of said trunk to permit said trunk to slide laterally in said inclined channel but prevent said lug from passing back through said inclined channel.

4. The assembly of claim 3, further comprising a terminal section in said inclined channel, said recess receives said protrusion when said trunk is in said terminal section.

5. The assembly of claim 4, further comprising a transition section in said inclined channel between said entry opening and said terminal section, said transition section having an inclined upper edge for camming said trunk into said terminal section.

6. The assembly of claim 5, wherein said transition section has an inclined lower edge for camming said trunk into said entry opening.

7. The assembly of claim 3, wherein said entry opening has lateral edges adjacent to said inclined channel between said first upper edge and said second upper edge and the first lower edge and said second lower edge; said lateral edges limiting lateral movement of said tab in said inclined channel.

8. The assembly of claim 3, wherein said bill is configured to apply pressure to the member when said trunk is in said terminal section.

9. The assembly of claim 1, wherein said wall is a downcomer in a fluid contacting vessel and said member is a deck of a tray in said fluid contacting vessel.

10. A clip for holding down a member comprising:
a first panel comprising a tab extending from said first panel, said tab comprising a trunk and a lug extending from said trunk, said first panel adapted for engaging a first side of a wall comprising a cut-out adapted to receive said trunk and said lug of said tab inserted therein, said lug engaging a second side of said wall upon lateral movement of said tab once inserted into the cut-out;
a dimple protruding from said first panel adapted to engage a recess in said wall disposed laterally to said cut-out upon lateral movement of said tab once inserted into the cut-out;
a second panel integral with and normal to said first panel for engaging the member;
a bill extending in a direction away from and beyond said second panel, said bill configured to apply pressure to the member while the second panel is spaced from the member.

11. The clip of claim 10, wherein said tab is cut from said first panel and bent away from said first panel to leave an opening in said first panel having the same shape as the tab.

12. The clip of claim 10, wherein said tab is T-shaped.

13. A method of holding down a member in a vessel comprising:
inserting a tab extending from a first panel of a clip into a cut-out in a wall in a first position, wherein the clip comprises a second panel integral with said first panel; and
sliding said tab laterally along a vertically oriented, inclined channel extending from said cut-out, to a second position at which a protrusion extending from said first panel engages a recess in said wall located laterally to said cut-out,
wherein said second panel holds down the member while in the second position,
wherein a trunk and a lug of said tab are inserted into an entry opening in said cut-out with said first panel adjacent to a first side of said wall in said first position and said lug engages a second side of said wall in said second position,
further comprising sliding said trunk of said tab laterally from said first position to said second position through said inclined channel, wherein said inclined channel is more narrow than said entry opening, and,
wherein sliding said trunk over inclined edges of said inclined channel cams said tab downwardly to said second position to achieve engagement of said second panel and said member.

14. The method of claim 13, in which said wall is a downcomer in a fluid contacting vessel and said member is a deck of a tray in said fluid contacting vessel.

* * * * *